(12) United States Patent
Kobayashi

(10) Patent No.: US 12,557,162 B2
(45) Date of Patent: Feb. 17, 2026

(54) COMMUNICATION SYSTEM

(71) Applicant: Toshiba Tec Kabushiki Kaisha, Tokyo (JP)

(72) Inventor: Tohru Kobayashi, Numazu Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 494 days.

(21) Appl. No.: 18/185,838

(22) Filed: Mar. 17, 2023

(65) Prior Publication Data

US 2023/0422327 A1     Dec. 28, 2023

(30) Foreign Application Priority Data

Jun. 27, 2022   (JP) ................................. 2022-102668

(51) Int. Cl.
*H04W 76/15* (2018.01)
*H04L 9/40* (2022.01)
*H04W 76/18* (2018.01)

(52) U.S. Cl.
CPC ......... *H04W 76/15* (2018.02); *H04L 63/0823* (2013.01); *H04W 76/18* (2018.02)

(58) Field of Classification Search
CPC .... H04W 76/15; H04W 76/18; H04L 63/0823
See application file for complete search history.

(56) References Cited

U.S. PATENT DOCUMENTS

| | | | |
|---|---|---|---|
| 6,584,364 B1 | 6/2003 | Iwamoto | |
| 11,445,432 B2 * | 9/2022 | Ghessassi | ............. H04W 48/16 |
| 2003/0191542 A1 * | 10/2003 | Iwamoto | ............. G05B 19/4185 |
| | | | 700/2 |
| 2003/0191543 A1 * | 10/2003 | Iwamoto | ............. G05B 19/4185 |
| | | | 700/2 |
| 2017/0118789 A1 * | 4/2017 | Lee | ......................... H04B 1/385 |
| 2019/0200408 A1 * | 6/2019 | He | ......................... H04W 24/08 |

(Continued)

FOREIGN PATENT DOCUMENTS

JP         2021040176 A      3/2021

OTHER PUBLICATIONS

Japanese Office Action dated Nov. 4, 2025, mailed in counterpart Japanese Application No. 2022-102668, 6 pages.

*Primary Examiner* — Parth Patel
(74) *Attorney, Agent, or Firm* — Kim & Stewart LLP

(57) ABSTRACT

A communication system for unmanned stores includes a management server and an access point connected to a communication network. In-store devices are configured to provide information to a system processing device by wireless communication via the access point and each include a first wireless controller for communicating with the access point according to certain parameters and a second wireless controller for directly communicating with the other in-store devices. A processor in an initial setup mode turns on the second wireless controller, determines whether the in-store device is a representative terminal based on information stored in a local storage unit. If the in-store device is a representative terminal, initial setting information is broadcast via the second wireless controller. The initial setting information includes the certain parameters for the other in-store devices. If not a representative terminal, the processor waits for reception of initial setting information.

20 Claims, 8 Drawing Sheets

(56) References Cited

U.S. PATENT DOCUMENTS

| | | | | |
|---|---|---|---|---|
| 2020/0336878 | A1* | 10/2020 | Chieh Tseng | H04W 76/18 |
| 2021/0127262 | A1* | 4/2021 | Park | H04W 12/50 |
| 2022/0217803 | A1* | 7/2022 | Chakraborty | H04W 76/19 |
| 2023/0388902 | A1* | 11/2023 | Wakabayashi | H04W 48/16 |
| 2023/0422327 | A1* | 12/2023 | Kobayashi | H04L 63/0823 |

* cited by examiner

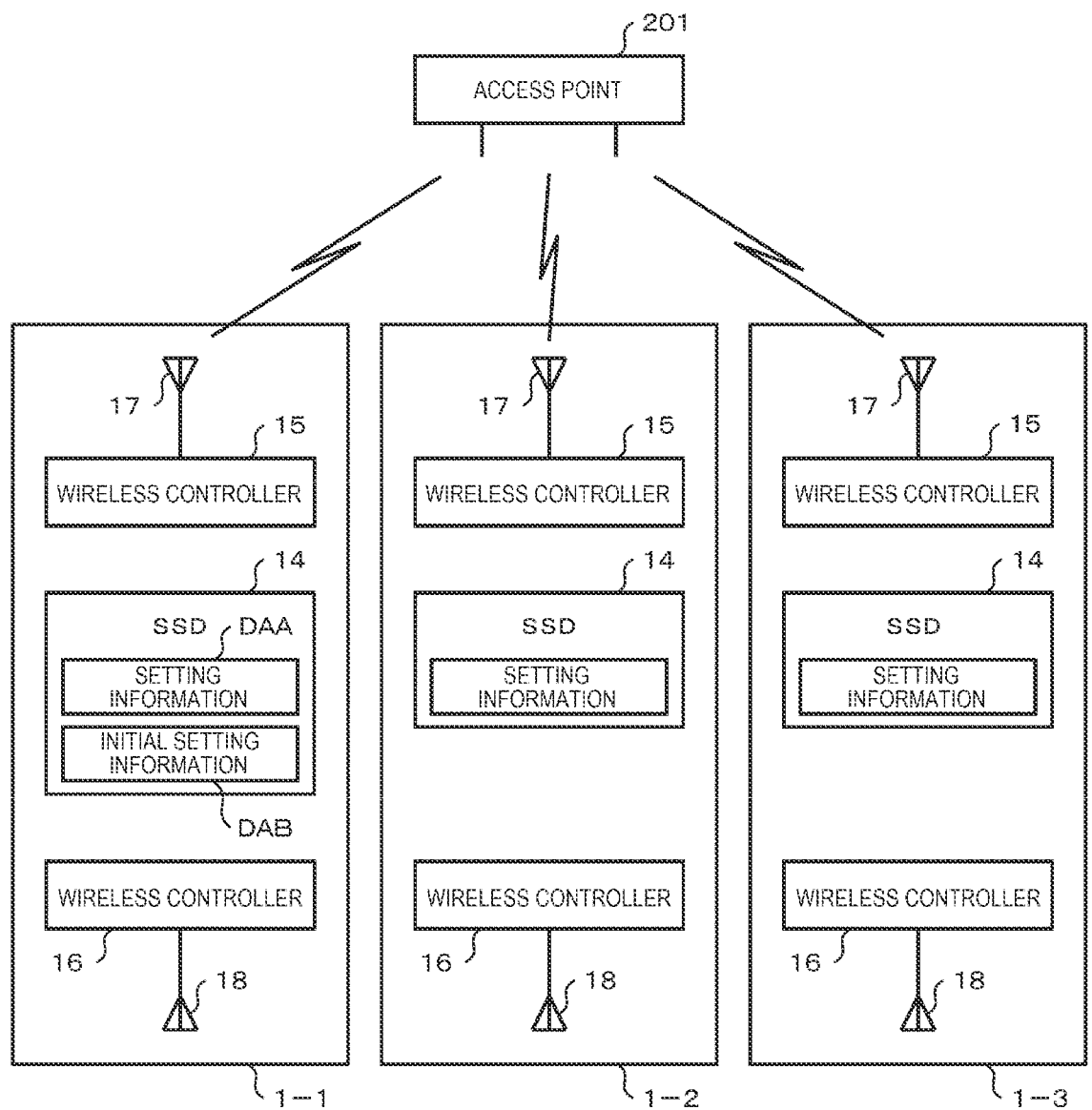

COMMUNICATION SYSTEM

CROSS-REFERENCE TO RELATED APPLICATION

This application is based upon and claims the benefit of priority from Japanese Patent Application No. 2022-102668, filed Jun. 27, 2022, the entire contents of which are incorporated herein by reference.

FIELD

Embodiments described herein relate generally to communication systems including several communication devices, each requiring initial setup.

BACKGROUND

In an unmanned store system, typically a large number of various sensors, such as cameras, are arranged in a store in order to monitor behavior of shoppers, movements of products, and the like within the store. When data obtained by these sensors is collected by a processing device, it is preferable to use a communication network such as a wireless local area network (LAN).

However, it is required to perform initial setup (e.g., enter appropriate device settings and the like) for performing communication via the communication network on a large number of communication devices for the sensors distributed around the store, and in the related art, a worker is required to perform this work for individually performing initial setup for each of these devices, which is a burden for the worker.

In view of such circumstances, it is desired to reduce trouble associated with an initial setup for performing such communication via a communication network.

BRIEF DESCRIPTION OF THE DRAWINGS

FIG. 9 is a diagram illustrating a relationship between a representative terminal and two terminals for which an initial setting has been performed.

DETAILED DESCRIPTION

In general, a communication system capable of reducing trouble/effort in an initial setup of a plurality of devices for performing communication among via a communication network is provided.

In general, according to one embodiment, a communication system for unmanned stores includes a management server connected to a communication network, a system processing device connected to the communication network, a wireless communication access point connected to the communication network, and a plurality of communication devices. The communication devices are configured to provide information to the system processing device by wireless communication through the wireless communication access point and the communication network. Each communication device includes a first wireless controller for communicating with the wireless communication access point according to certain setup parameters, a second wireless controller for directly communicating with other communication devices in the plurality of communication devices, a local storage unit for storing information in a nonvolatile manner, and a processor. The processor is configured to, in an initial setup operating mode, turn on the second wireless controller and determine whether the communication device is a representative terminal or a set terminal based on information stored in the local storage unit. If the communication device is the representative terminal, the processor broadcasts initial setting information via the second wireless controller. The initial setting information is stored in the local storage unit before entering the initial setup operating mode and includes the certain setup parameters for first wireless controllers of the other communication devices in the plurality of communication devices. If the communication device is the set terminal, the processor waits for reception of initial setting information via the second wireless controller.

Hereinafter, certain example embodiments will be described with reference to the drawings. As an example, an unmanned store system is implemented by applying a communication system of an embodiment.

Figure 1:
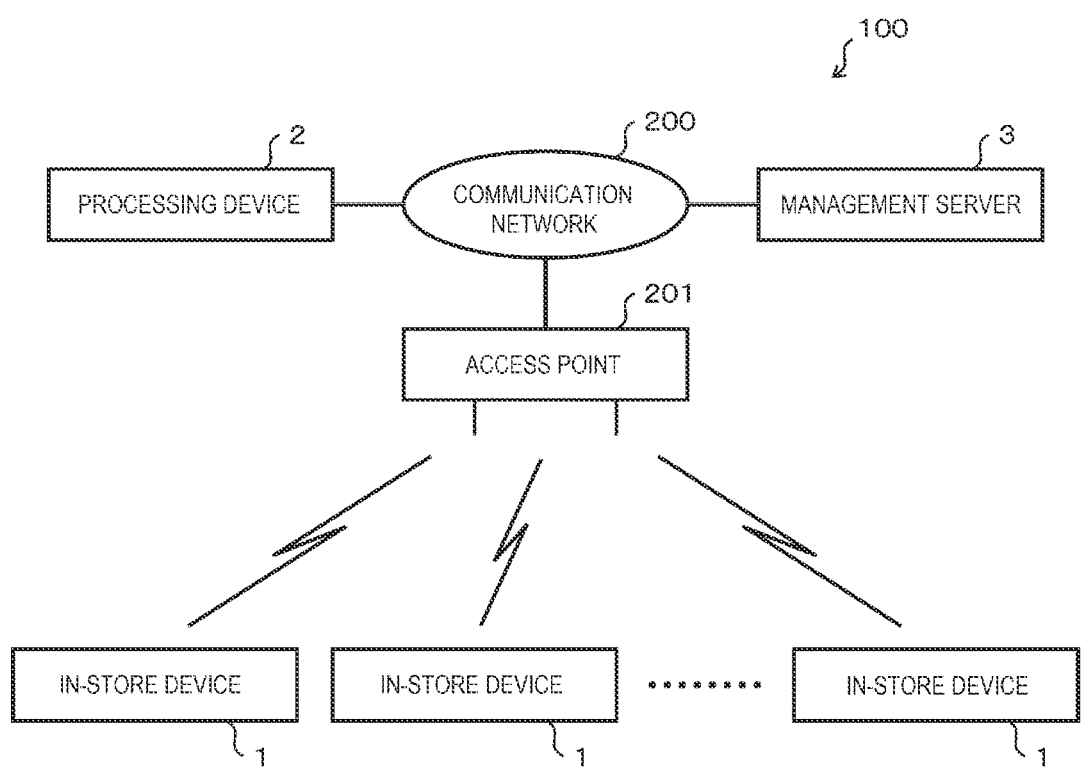
FIG. 1 is a block diagram illustrating a schematic configuration of an unmanned store system according to an embodiment.

FIG. 1 is a block diagram illustrating a schematic configuration of an unmanned store system 100.

The unmanned store system 100 has a configuration in which a plurality of in-store devices 1, a processing device 2, and a management server 3 can communicate with one another via a communication network 200.

The plurality of in-store devices 1 are distributed and disposed at various positions in the store. The in-store devices 1 are connected to the communication network 200 via wireless communication to an access point 201 of the communication network 200. The in-store devices 1 can include various sensors, such as cameras, and send outputs from the sensors to the processing device 2 via the communication network 200 either without executing any processing on the sensor output or after executing certain predetermined processing related to the sensor output. Thus, the in-store devices 1, while possibly incorporating one or more sensors, may all be referred to as communication devices.

The processing device 2 collects information transmitted from the in-store devices 1, monitors a behavior of a shopper based on this information, and executes processing associated with registering a commodity when selected by the shopper for purchase, performing settlement (payment) operations for the purchased commodity, or the like.

The management server 3 executes processing for managing the in-store devices 1.

A plurality of access points 201 may be connected to the communication network 200, and the plurality of in-store devices 1 may respectively communicate with any one or more of the plurality of access points 201 in a wireless manner.

Figure 2:
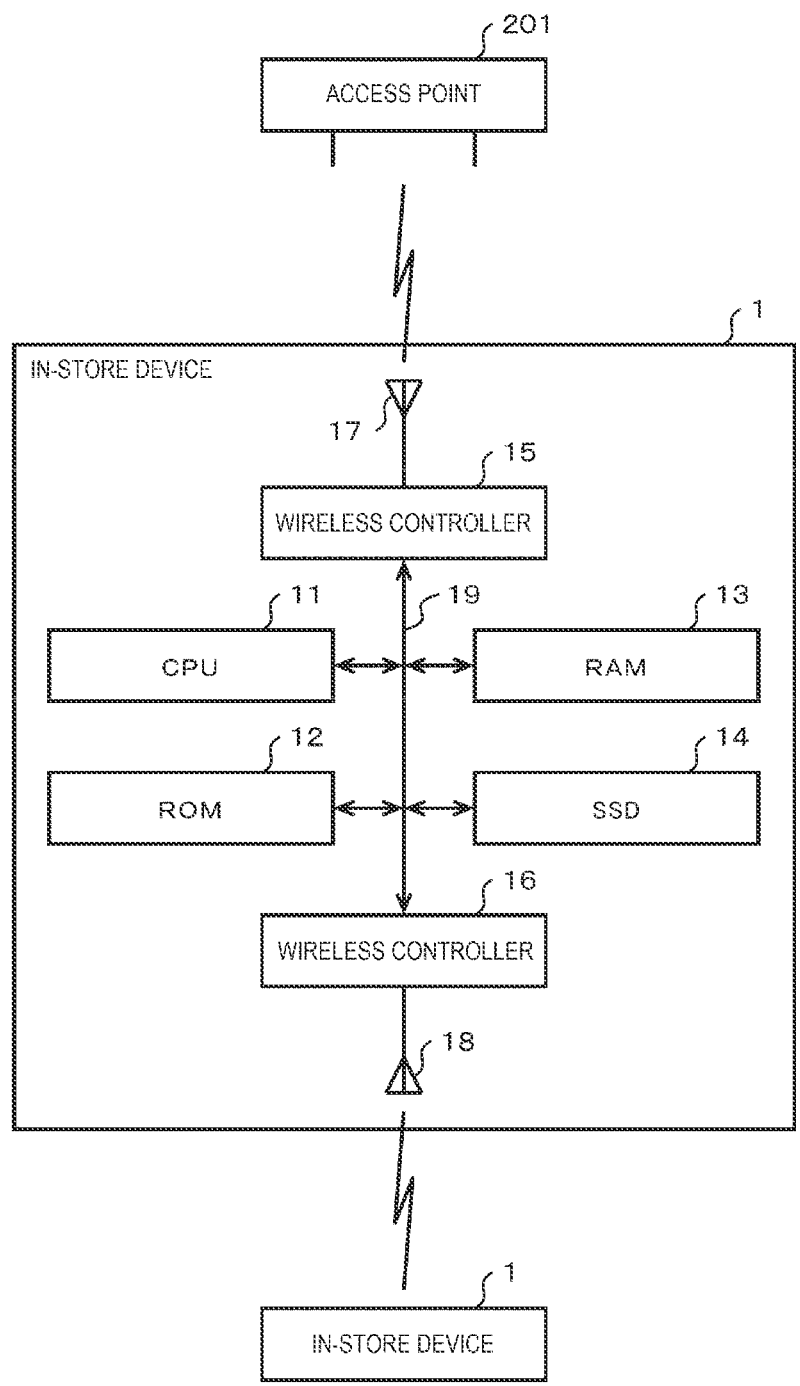
FIG. 2 is a block diagram of an in-store device.

FIG. 2 is a block diagram showing a configuration of an in-store device 1.

The in-store device 1 includes a central processing unit (CPU) 11, a read only memory (ROM) 12, a random access memory (RAM) 13, a solid-state drive (SSD) 14, a wireless controller 15, a wireless controller 16, an antenna 17, an antenna 18, a transmission path 19 (e.g., bus), and the like. The CPU 11, the ROM 12, the RAM 13, the SSD 14, and the wireless controllers 15 and 16 are connected via the transmission path 19. The in-store device 1 further includes or is connected to another device or sensor such as a camera, but specifically illustration of such an additional device is omitted. The plurality of in-store devices 1 each share the depicted configuration illustrated in FIG. 2 in common, but the other additional devices/sensors are not necessarily common amongst all the in-store devices 1. For example, one in-store device 1 may include a camera, and another in-store device 1 may include a weight sensor (e.g., a display shelf-embedded scale).

The CPU 11 executes information processing for controlling sub-units to implement various functions as the in-store device 1 in accordance with an operating system, middleware, and/or an information processing software program such as an application program. In addition, the CPU 11 executes the information processing for an initial setting (hereinafter, referred to as initial setting processing or setup processing).

The ROM 12 stores data used when the CPU 11 executes various processing. The ROM 12 may store a part of an information processing program. In the present embodiment, the ROM 12 specifically stores an initial setting program as firmware in which instructions for the initial setup processing are described. Alternatively, the initial setting program may be stored in the SSD 14.

The RAM 13 temporarily stores data necessary for the CPU 11 to execute an information processing and data generated by a processing in the CPU 11.

The SSD 14 stores data used when the CPU 11 executes various processing and data generated by a processing in the CPU 11. The SSD 14 may store an information processing program. Instead of the SSD 14, or in addition to the SSD 14, an electric erasable programmable read-only memory (EEPROM), a hard disc drive (HDD), or other various well-known storage devices may be incorporated in the in-store device 1.

The wireless controller 15 executes a communication processing for data communication via the communication network 200 (access point 201) via the antenna 17. The wireless controller 15 may be, for example, an existing communication device type conforming to the IEEE 802.11 standard. The wireless controller 15 is an example of a first communication unit.

The wireless controller 16 executes a communication processing for performing data communication with another in-store device 1 via the antenna 18 in a direct, wireless communication manner. The wireless controller 16 may be, for example, an existing communication device for 920 MHz band wireless communication. The wireless controller 16 is an example of a second communication unit.

The antenna 17 radiates radio waves according to a transmission signal output from the wireless controller 15, and sends a wireless reception signal to the wireless controller 15.

The antenna 18 radiates radio waves according to a transmission signal output from the wireless controller 16, and sends a wireless reception signal to the wireless controller 15. In some examples, a single antenna structure may be shared as the antennas 17 and 18.

The transmission path 19 includes an address bus, a data bus, a control signal line, and the like, and transmits data and a control signal transmitted and received among connected units.

The Internet, a virtual private network (VPN), a LAN, a public communication network, a mobile communication network, and the like can be appropriately used alone or in combination as the communication network 200. For example, the LAN and the Internet are used as the communication network 200.

Figure 3:
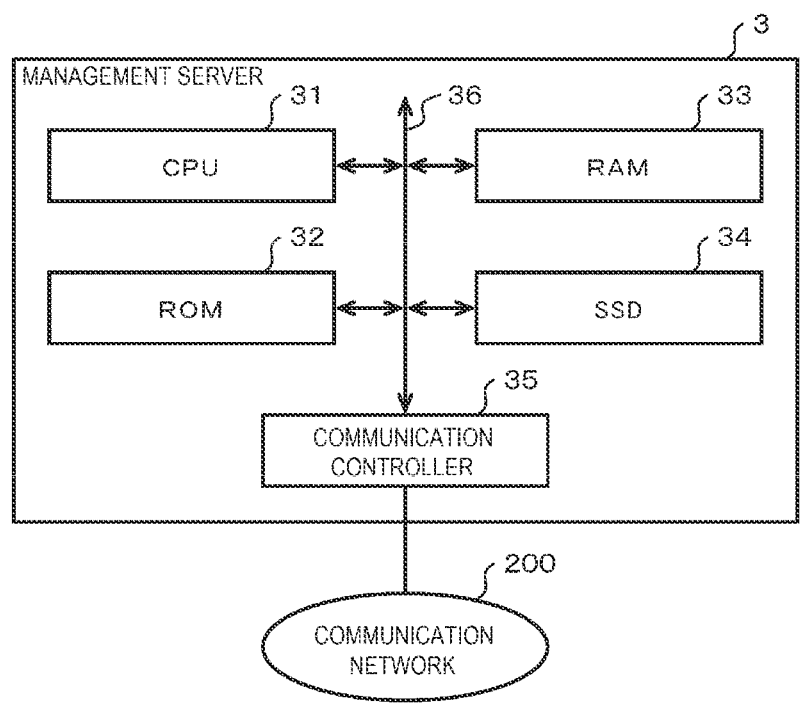
FIG. 3 is a block diagram of a management server.

FIG. 3 is a block diagram of the management server 3 that executes an information processing for managing initial settings in the in-store devices 1.

The management server 3 includes a CPU 31, a ROM 32, a RAM 33, an SSD 34, a communication controller 35, a transmission path 36, and the like. The CPU 31, the ROM 32, the RAM 33, the SSD 34, and the communication controller 35 are connected via the transmission path 36.

The CPU 31 executes an information processing for controlling units to implement various functions as the management server 3 in accordance with an operating system, middleware, and an information processing program such as an application program. The CPU 31 also executes processing for managing initial settings of the in-store devices 1 (hereinafter referred to as a management processing).

The ROM 32 stores data used when the CPU 31 executes various processing. The ROM 32 can store a part of an information processing program.

The RAM 33 temporarily stores data necessary for the CPU 31 to execute an information processing and data generated by a processing in the CPU 31.

The SSD 34 stores data used when the CPU 31 executes various processing and data generated by a processing in the CPU 31. The SSD 34 may store an information processing program. In the present embodiment, the SSD 34 stores a management program in which instructions for management processing are described. Alternatively, the management program may be stored in the ROM 32. Instead of the SSD 34, or in addition to the SSD 34, an EEPROM, an HDD, or other various well-known storage devices may be incorporated.

The communication controller 35 executes processing for performing data communication via the communication network 200. The communication controller 35 may be, for example, an existing Internet communication device.

The transmission path 36 includes an address bus, a data bus, a control signal line, and the like, and transmits data and a control signal transmitted and received among connected units.

Next, an operation of the unmanned store system 100 will be described.

In the unmanned store system 100, an in-store device 1 acquires various kinds of information related to a behavior of a shopper and/or a movement of a commodity within the store. The processing device 2 collects the information acquired by the in-store devices 1 and, for example, identifies a commodity that has been picked up by a shopper in the store. When the shopper leaves the store with the commodity, the processing device 2 executes a settlement processing for payment for the picked-up commodity picked. In general, the information processing for processing such a transaction in the unmanned store may be similar to the processing executed in existing unmanned store systems.

The operation of the unmanned store system 100 according to the present embodiment is distinct with respect to improvements in operations at the time of the initial setting (setup) of the in-store devices 1 so such devices can perform communication via the communication network 200 when the unmanned store system 100 is being newly constructed or modified in a store.

When a configuration of the unmanned store system 100 is being determined, and it must be determined which access point 201 is to be used by the in-store devices 1, various kinds of information (e.g., device settings, communication parameters, etc.) which are necessary for performing communication via the communication network 200 using an access point 201 must be determined and set for the different in-store devices 1. The various kinds of information in this context include, for example, a setting value for "Wi-Fi" communication and a setting value of an IP address such as the device's own IP address, a subnet mask, a default gateway IP address, a server IP address, and connection authentication information (e.g., passwords, passcodes, security protocols, etc.). In response to an instruction from a designer or the like of the unmanned store system 100, an information processing device may generate initial setting information in which setting information including the various kinds of information described above is associated with an identifier for individually identifying each in-store device 1 to be provided in the unmanned store system 100, and store this initial setting information in the SSD 34 of the management server 3. The identifier used in this context may be a serial number of the in-store device 1, however, in general, information may be used as the identifier as long as the in-store devices 1 included in the unmanned store system 100 can be individually identified.

A data file (hereinafter, referred to as an additional file) ultimately to be stored in the SSD 14 of the in-store device 1 after the completion of the initial setting based on the setting information is initially stored in the SSD 34 of the management server 3 in response to an instruction from the designer or the like of the unmanned store system 100.

When the unmanned store system 100 is constructed in a store, the communication network 200 can be first prepared in the store, and the access point(s) 201 disposed at an appropriate location. The processing device 2 can be installed in a backroom, back office, or the like of the store and connected to the communication network 200. In the present example, the management server 3 may be provided as a cloud server that can be accessed via the communication network 200.

Thereafter, a plurality of in-store devices 1 are disposed at various positions in a sales area of the store. An installation worker or the like selects one in-store device 1 among the plurality of in-store devices 1 for performing the initial setting. Hereinafter, when it is necessary to distinguish the in-store device 1 selected for performing the initial setup from another in-store device 1, the in-store device 1 selected for performing the initial setup is referred to as a "representative terminal," and the other in-store devices 1 are referred to as a "set terminal."

In the representative terminal (a worker-selected in-store device 1), the CPU 11 performs the initial setup for performing communication via the communication network 200 in response to an instruction from an installation worker or another at any time, such as at the time of manufacturing, preparation for shipment, or before installation in a store. Setting information determined as described above for the selected in-store device 1 (representative terminal) is used in the initial setup process. Initial setting information matching that stored in the SSD 34 of the management server 3 is written to the SSD 14 of the representative terminal by the installation worker or another worker. Thus, the SSD 14 of the representative terminal functions as a storage unit that stores the setting information for the initial setup process.

The set terminals are, for example, in-store devices 1 still in a factory shipment state in which there has been no customization for communication performed by the wireless controller 15 of the set terminal.

Figure 4:
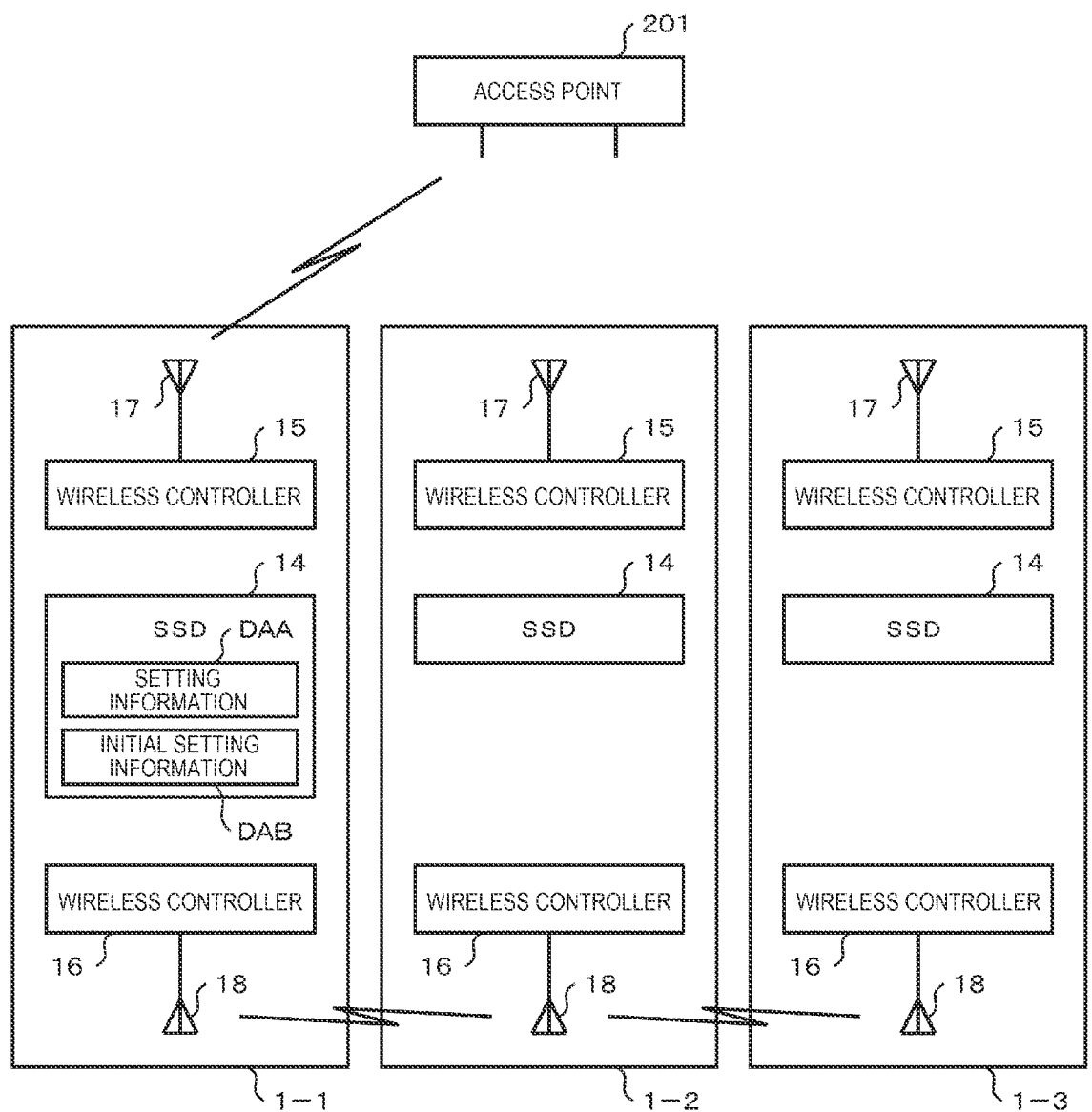
FIG. 4 is a diagram illustrating a relationship between a representative terminal disposed in a store and two terminals for which an initial setting has not been performed.

FIG. 4 is a diagram showing a relationship between a representative terminal 1-1 and two set terminals 1-2 and 1-3 before the initial setup process is performed.

The SSD 14 of the representative terminal 1-1 stores setting information DAA (for performing communication via using the access point 201) prior to the initial setup processing. The SSD 14 of the representative terminal 1-1 also stores initial setting information DAB matching that stored in the SSD 34. The representative terminal 1-1 can perform wireless communication via the wireless controller 15 to the access point 201 based on the setting information DAA and thus perform communication via the communication network 200 using the access point 201.

The setting information DAA and the initial setting information DAB are not stored in the SSD 14 of the set terminal 1-2 or the SSD 14 of the set terminal 1-3. Therefore, the set terminal 1-2 and the set terminal 1-3 are initially in a state in which the respective wireless controllers 15 cannot perform wireless communication with the access point 201 or the communication network 200 using the access point 201.

However, the representative terminal 1-1 and the set terminals 1-2 and 1-3 can perform wireless communication with each other (and other in-store devices 1) using the wireless controller 16. In the example in FIG. 4, the set terminal 1-2 can directly communicate with both the representative terminal 1-1 and the set terminal 1-3, but the representative terminal 1-1 and the set terminal 1-3 cannot directly communicate with each other because the representative terminal 1-1 and the set terminal 1-3 are separated from each other by more than the communicable distance of the respective wireless controllers 16.

A worker arranges all the in-store devices 1 in the unmanned store system 100 at required positions in the store, and then starts (e.g., turns on) the in-store devices 1 in an initial setting mode. Then, the CPU 11 of each in-store device 1 starts initial setting processing based on the initial setting program stored in the ROM 12.

Figure 5:
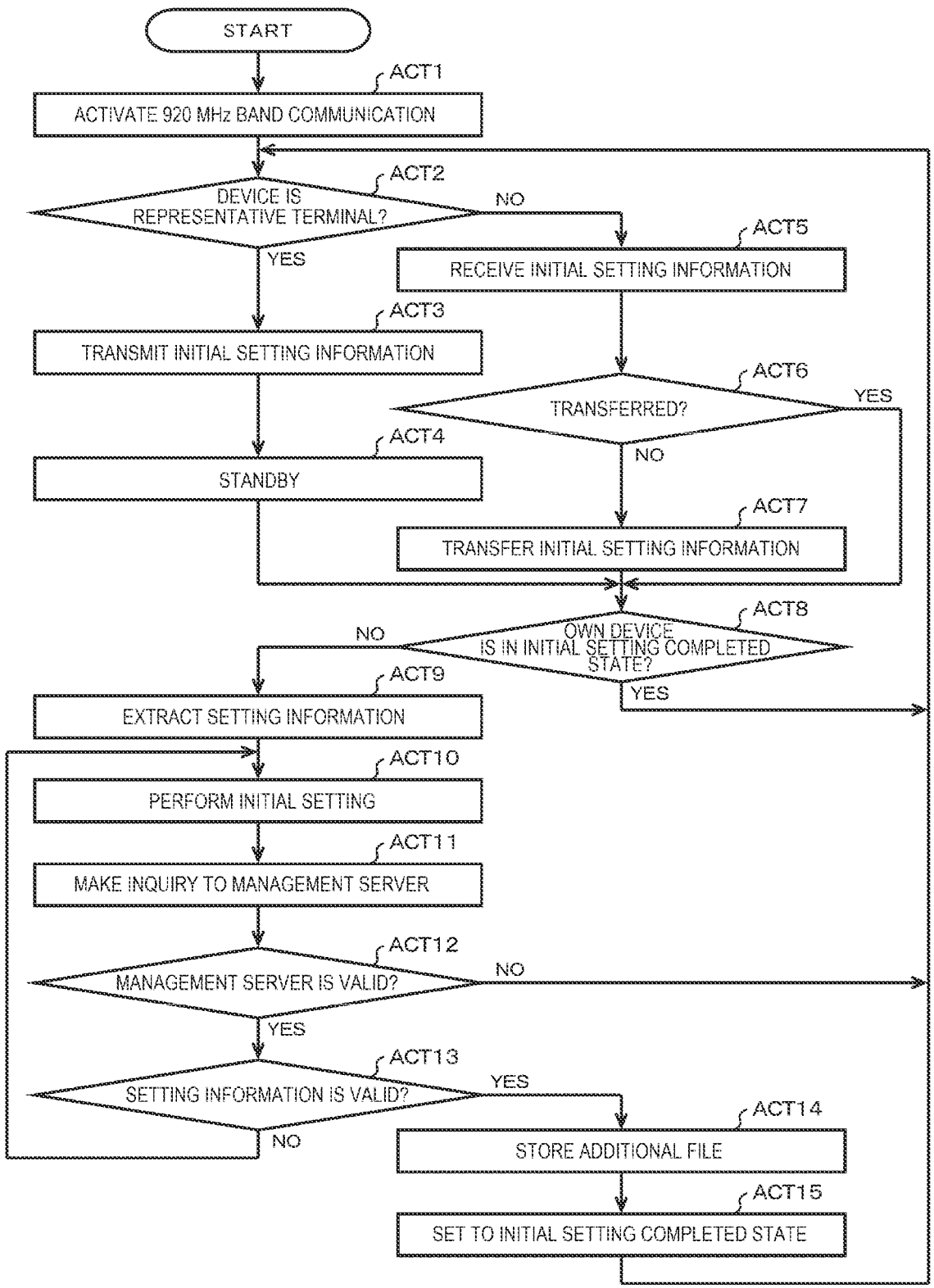
FIG. 5 is a flowchart of a CPU processing procedure illustrating a processing procedure in an initial setting processing.

FIG. 5 is a flowchart showing a processing procedure of the CPU 11 in the initial setting processing in the present example. In other examples, the order of processing may be changed, some processing may be omitted, or additional processing may be incorporated as appropriate.

In ACT 1, the CPU 11 activates 920 MHz band communication. That is, the CPU 11 starts (powers up) the wireless controller 16.

In ACT 2, the CPU 11 checks it is in a representative terminal. When the CPU 11 is in the representative terminal, the CPU 11 makes a YES determination and proceeds to ACT 3. That is, in the example in FIG. 4, when the CPU 11 is in the representative terminal 1-1, the processing proceeds to ACT 3.

In ACT 3, the CPU 11 sets the wireless controller 16 to a transmission state, and wirelessly transmits the initial setting information DAB stored in the SSD 14 from the antenna 18. At this time, the CPU 11 may repeatedly transmit the initial setting information DAB for a predetermined number of times at a predetermined time interval, or may transmit the initial setting information DAB only once. When the initial setting information DAB is to be repeatedly transmitted, the initial setting information DAB can be transmitted, for example, three times at an interval of 100 milliseconds. The purpose of the repeated transmission is to cope with the short period of transmission loss in wireless transmission, that is, intermittent bit garbling or the like. Thus, the CPU 11 in the representative terminal 1-1 executes an information processing based on the initial setting program, thereby functioning as a first transmission control unit.

In ACT 4, the CPU 11 is in standby for a predetermined standby time (standby period). If the CPU 11 executes ACT 3 again thereafter, the time interval can be adjusted. The standby time is typically set to be sufficiently longer than a repeated transmission interval in ACT 3. This is intended to prevent a wireless frequency from being excessively occupied due to setting a time interval for repeating ACT 3 to a certain period in a situation in which a transmission loss occurs in long-term wireless transmission. For example, the situation in which a transmission loss occurs in long-term wireless transmission is a situation in which transmission of the initial setting information DAB fails in all transmissions repeated in ACT 3 due to a situation in which an obstacle such as a person walks by in the required transmission path or the like.

When the in-store device 1 is a set terminal, the CPU 11 makes a NO determination in ACT 2 and proceeds to ACT 5. That is, in a case of the example in FIG. 4, when the CPU 11 is provided in the set terminal 1-2 or the set terminal 1-3, the processing proceeds to ACT 5.

In ACT 5, the CPU 11 sets the wireless controller 16 to a reception state to permit the wireless controller 16 to receive the initial setting information DAB that may be transmitted from another in-store device 1. Thus, the CPU 11 executes an information processing based on the initial setting program to function as a first reception control unit.

Figure 6:
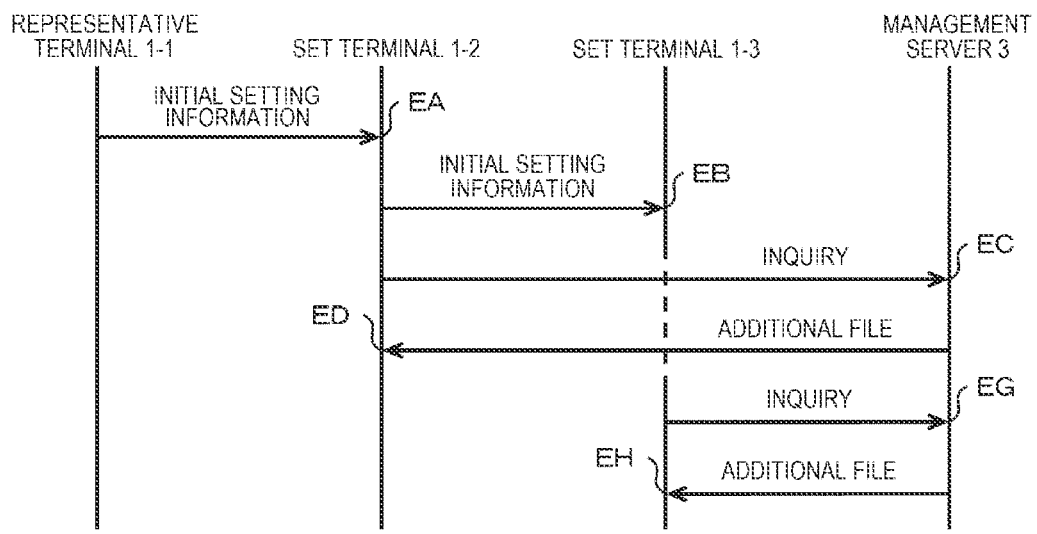
FIG. 6 is diagram showing an example of a sequence for transmitting and receiving various kinds of information between three in-store devices and the management server.
Figure 7:
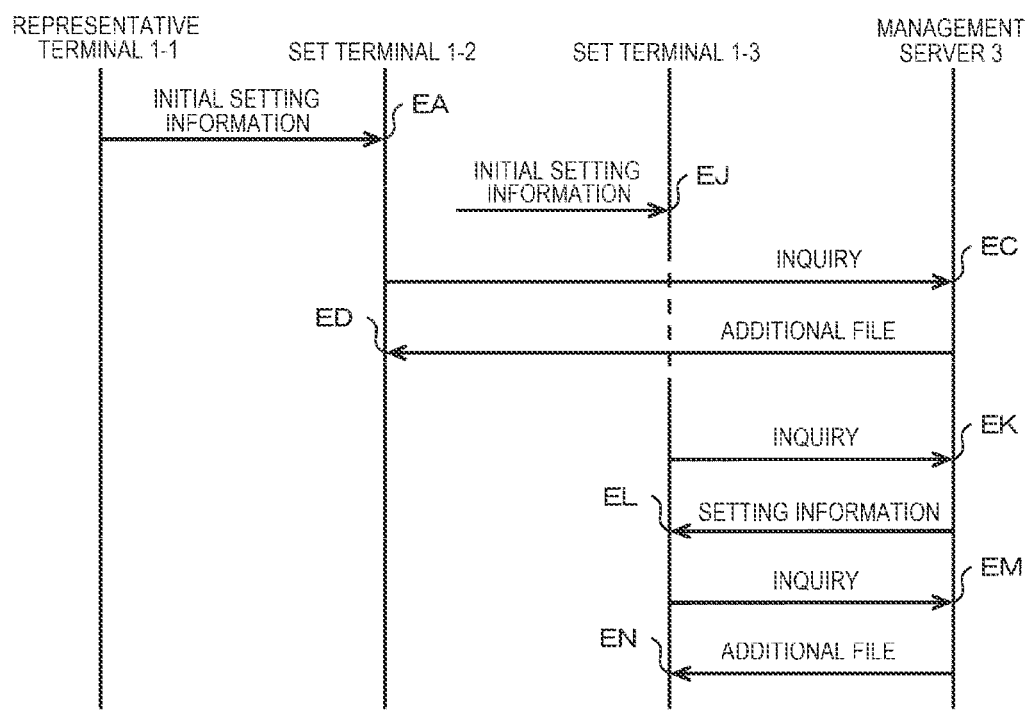
FIG. 7 is a diagram illustrating another example of a sequence.

FIG. 6 is a diagram illustrating an example of a sequence for transmitting and receiving various kinds of information between the three in-store devices 1 illustrated in FIG. 4 and the management server 3. FIG. 7 is a diagram showing another example of the sequence for transmitting and receiving various kinds of information between the three in-store devices 1 illustrated in FIG. 4 and the management server 3. Although FIGS. 6 and 7 correctly illustrate a temporal relationship among events for one set terminal, the temporal relationship among events for another set terminal may not necessarily correspond to that illustrated in FIGS. 6 and 7.

At an event EA in FIGS. 6 and 7, the initial setting information DAB transmitted from the representative terminal 1-1 reaches the set terminal 1-2, the wireless controller 16 of the set terminal 1-2 thus receives the initial setting information DAB, but the wireless controller 16 of the set terminal 1-3 does not receive the initial setting information DAB.

As in the set terminal 1-2, the CPU 11 of any in-store device 1 for which the respective wireless controller 16 receives the initial setting information DAB proceeds to ACT 6.

In ACT 6, the CPU 11 confirms whether the initial setting information DAB received by the wireless controller 16 has already been transferred. When the initial setting information DAB has not been transferred yet, the CPU 11 makes a NO determination and proceeds to ACT 7.

In ACT 7, the CPU 11 attempts to transfer the initial setting information DAB that has been received by the wireless controller 16 to another in-store device 1. For example, a method referred to as "flooding" can be applied to the transfer of the initial setting information DAB. That is, the CPU 11 causes wireless controller 16 to directly transmit the initial setting information DAB after being received by wireless controller 16 as described above. Thus, the CPU 11 executes an information processing based on the initial setting program to function as a second transmission control unit.

In the flooding method, the initial setting information DAB may continue to be attempted to be transferred for a long time. Therefore, it is preferable that the initial setting information DAB is packetized and transmitted, a time to live (TTL) is assigned to each packet, the TTL can be decremented every time a package is transferred, and a packet with the TTL of 0 is not transferred. Alternatively, another processing may be performed in which a sequence number is assigned to a packet, whether a packet is transferred is confirmed based on the sequence number, and a previously transferred packet is not transferred anymore.

At an event EB in FIG. 6, after the set terminal 1-2 transfers the initial setting information DAB, the initial setting information DAB reaches the set terminal 1-3 and the wireless controller 16 of the set terminal 1-3 thus receives the initial setting information DAB. In response to the reception, the CPU 11 of the set terminal 1-3 performs processing to ACT 6, and executes ACT 6 and ACT 7 in the same manner as already described above.

When the CPU 11 ends the standby state in ACT 4 or the transfer in ACT 7, the CPU 11 proceeds to ACT 8 in both cases. In some examples, the initial setting information already transferred in ACT 7 may be transferred again by another in-store device 1 and may thus be received again by the wireless controller 16. In this case, the CPU 11 makes a YES determination in ACT 6, passes ACT 7, and proceeds to ACT 8.

In ACT 8, the CPU 11 check whether it is in an in-store device 1 in an initial setting completed state. When in the initial setting completed state, the CPU 11 makes a YES determination and returns the processing to ACT 2. When not in the initial setting completed state, the CPU 11 makes a NO determination and proceeds to ACT 9.

In ACT 9, the CPU 11 extracts setting information associated with an identifier of the own device from setting information included in the initial setting information.

In ACT 10, the CPU 11 uses the extracted setting information to perform the initial setting for performing communication via the communication network 200 using the access point 201. The processing for performing the initial setting is a well-known processing for using a wireless LAN. When the initial setting is completed, communication via the communication network 200 using the access point 201 can be performed using the wireless controller 15. Thus, the CPU 11 executes an information processing based on the initial setting program, thereby causing the computer including the CPU 11 as a central part to function as a first setting unit.

The CPU 11 may restart the own device as necessary after the completion of the initial setting.

In ACT 11, the CPU 11 makes an inquiry to the management server 3 through communication via the communication network 200 using the access point 201. This inquiry requests the management server 3 to confirm whether the setting information extracted in ACT 9 is valid setting information to be used for the initial setup of the in-store device 1. Therefore, for example, when the CPU 11 exchanges information with the management server 3 during the inquiry, the CPU 11 transmits the setting information extracted in ACT 9 to the management server 3. Alternatively, for example, the CPU 11 transmits, to the management server 3, information for identifying the setting information extracted in ACT 9 is what kind of information among a large number of pieces of setting information.

Alternatively, for example, the CPU 11 may transmit, to the management server 3, a value such as a hash value obtained by performing a predetermined calculation processing on the setting information extracted in ACT 9.

The event EC in FIGS. 6 and 7 is an inquiry made by the set terminal 1-2 to the management server 3 about the setting information included in the initial setting information received in the event EA. The event EG in FIG. 6 is an inquiry made by the set terminal 1-3 to the management server 3 about the setting information included in the initial setting information received in the event EB.

The CPU 31 of the management server 3 executes a management processing based on a management program stored in the SSD 34.

Figure 8:
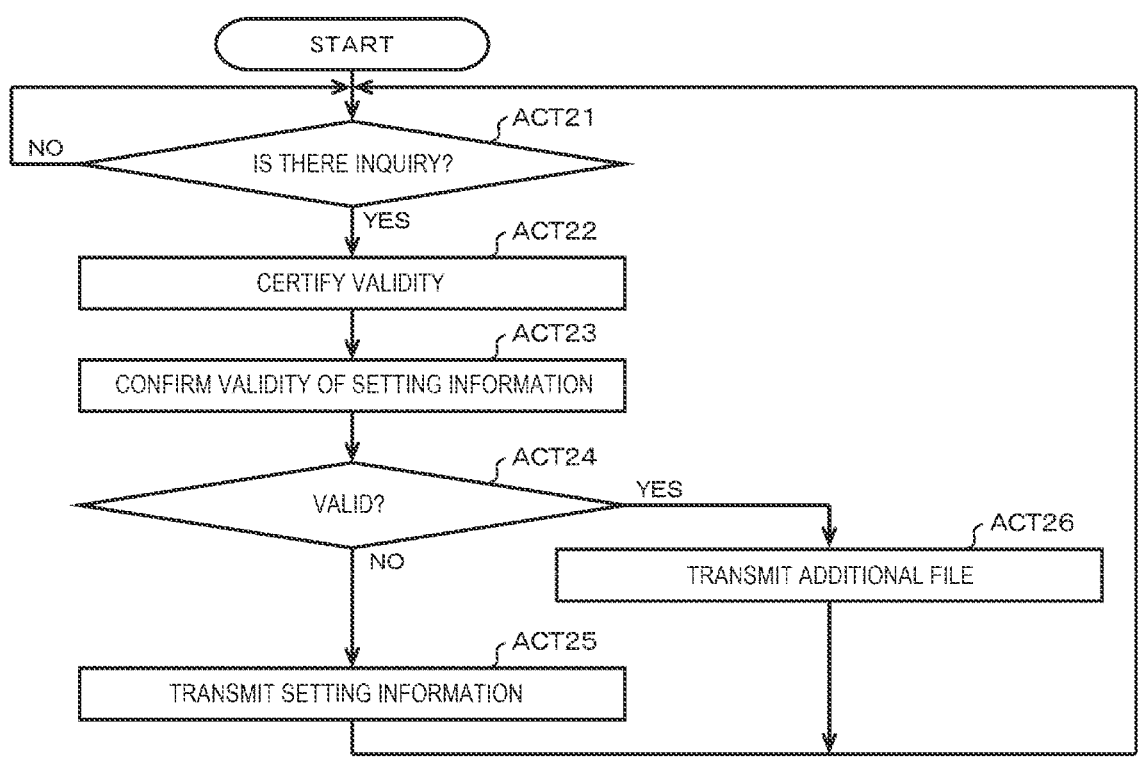
FIG. 8 is a flowchart illustrating a processing procedure in management processing.

FIG. 8 is a flowchart showing a processing procedure of the CPU 31 in the management processing.

In ACT 21, the CPU 31 waits for an inquiry from any one of the in-store devices 1. When the CPU 11 of the in-store device 1 makes an inquiry to the management server 3 in the processing in ACT 11 in FIG. 5, the CPU 31 makes a YES determination and proceeds to ACT 22 in FIG. 8.

In ACT 22, the CPU 31 certifies validity of the in-store device 1 that sent the inquiry. That is, the CPU 31 executes a processing for certifying for the in-store device 1 that an inquiry destination is the management server 3 that manages the in-store device 1. For example, the CPU 31 sends a digital certificate prepared in advance from the communication controller 35 to the in-store device 1 that sent the inquiry through communication network 200.

In ACT 23, the CPU 31 confirms validity of the setting information that is inquired. For example, the CPU 11 checks whether the initial setting information stored in the SSD 34 matches the setting information transmitted at the time of the inquiry.

In ACT 24, the CPU 31 checks whether the setting information is valid. For example, when it is confirmed in ACT 23 that there is no matching setting information, the CPU 31 confirms that the received setting information is not valid, makes a NO determination, and proceeds to ACT 25.

In ACT 25, the CPU 31 extracts valid setting information to be used in the initial setup for the in-store device 1 that sent the inquiry from the SSD 34, and sends the extracted setting information to the inquiring in-store device 1 through the communication network 200 as a response to the inquiry. The CPU 31 may transmit the initial setting information stored in the SSD 34 to the inquiring in-store device 1. Then, the CPU 31 returns to the standby state in ACT 21 and prepares for any subsequent inquiry.

If it is confirmed in ACT 23 that there is corresponding setting information, the CPU 31 checks that the setting information is valid, makes a YES determination in ACT 24, and proceeds to ACT 26.

In ACT 26, the CPU 31 reads an additional file necessary for the inquiring in-store device 1 from the SSD 34, and sends the additional file to the in-store device 1 through the communication network 200 as a response to the inquiry. Then, the CPU 31 returns to the standby state in ACT 21 and prepares for any subsequent inquiry.

An event ED in FIGS. 6 and 7 is about transmission of an additional file as a response to the inquiry in the event EC. An event EH in FIG. 6 is about transmission of an additional file as a response to the inquiry in the event EG. That is, FIG. 6 illustrates a case where valid setting data is obtained for both the set terminal 1-2 and the set terminal 1-3.

The CPU 11 proceeds to ACT 12 after making the inquiry in ACT 11 in FIG. 5.

In ACT 12, the CPU 11 checks whether the management server 3 to which the inquiry is to be sent is valid. For example, the CPU 11 transmits, via the communication network 200, a digital certificate that was made by the CPU 31 in ACT 22 in FIG. 8 and is sent from the management server 3, and waits for the digital certificate to be received by the wireless controller 15. For example, the CPU 11 confirms whether a transmission source of authentication information is a valid management server 3 based on the digital certificate received by the wireless controller 15.

For communication via the wireless controller 16, authentication of a communication partner is not performed. Therefore, there is no guarantee that the initial setting information received in ACT 5 was transmitted from the in-store device 1 that is set as a representative terminal or that the initial setting information was correctly transferred by another set terminal. For various reasons, initial setting information that is different from the initial setting information DAB stored in the SSD 14 of the representative terminal may be received in ACT 5. In such a case, the initial setup in ACT 10 may fail, or the initial setup in ACT 10 may be performed incorrectly, and therefore the intended (valid) management server 3 may not be accessed. In these cases, the CPU 11 makes a NO determination in ACT 12, returns the processing to ACT 2, and repeats the processing of ACT 2 and the subsequent ACTs in the same manner as described above.

When it is determined that the management server 3 is valid, the CPU 11 makes a YES determination in ACT 12 and proceeds to ACT 13.

In ACT 13, the CPU 11 checks whether the setting information extracted in ACT 9 is valid. For example, the CPU 11 causes the wireless controller 15 to start to receive information transmitted from the management server 3 as a response to the inquiry. As described above, the setting information is transmitted from the management server 3 when the setting information is not valid. Thus, when the setting information is received by the wireless controller 15, the CPU 11 determines that the setting information is not valid, makes a NO determination, and returns the processing to ACT 10. Then, the CPU 11 performs the initial setting in ACT 10 again using the setting information transmitted from the management server 3. Thus, the CPU 11 executes an information processing based on the initial setting program to function as a confirmation unit, a second reception control unit, and a second setting unit.

In an event EJ in FIG. 7, initial setting information from an unknown transmission source reaches the set terminal 1-3, and the wireless controller 16 of the set terminal 1-3 receives this initial setting information. Therefore, the setting information is transmitted as an event EL as a response to an inquiry in an event EK about setting information included in the initial setting information received here. After the setting information is received, the set terminal 1-3 performs initial setup based on the setting information again, and then an inquiry about the setting information is made as an event EM. Since the setting information that is inquired about in the event EM is valid setting information previously transmitted by the management server 3, the management server 3 transmits an additional file in an event EN as a response to the inquiry in the event EM.

As described above, when the setting information is valid, the additional file is sent from the management server 3. Thus, when the additional file is received by the wireless controller 15, the CPU 11 determines that the setting information is valid, makes a YES determination in ACT 13, and proceeds to ACT 14. Thus, the CPU 11 executes an information processing based on the initial setting program to function as a third reception control unit for causing the wireless controller 15 to receive the additional file that is information different from the setting information.

In ACT 14, the CPU 11 stores the additional file received by the wireless controller 15 as described above in the SSD 14.

In ACT 15, the CPU 11 sets the own device to the initial setting completed state. For example, the CPU 11 stores, in the SSD 14, predetermined information indicating that the own device is in the initial setting completed state. Then, the CPU 11 returns to ACT 2 and repeats the processing in ACT 2 and subsequent ACTs in the same manner as described above.

The setting processing described above is executed in the plurality of in-store devices 1, so that initial settings are performed in set terminals based on the setting information of the in-store device 1 included in the initial setting information DAB stored in the SSD 14 of a representative terminal, and the set terminals 1-2 and 1-3 are brought into a state in which the set terminals 1-2 and 1-3 can perform communication via the communication network 200 using the access point 201. Other set terminals are also brought into a state in which they can perform communication via the communication network 200 in the same manner.

FIG. 9 is a diagram illustrating a relationship between the representative terminal 1-1 and two set terminals 1-2 and 1-3 for which the initial setting is completed.

A worker then waits for a certain period of time until initial setting of all set terminals is completed, and then ends the execution of the initial setting processing in the in-store devices 1. Then, the worker starts the in-store devices 1 in a normal operation mode in which required information can be transmitted to the processing device 2 via the communication network 200 using the access point 201.

As described above, according to the unmanned store system 100, a worker performs the initial communication setup for just one of the in-store devices 1 and also stores the initial setting information DAB in the SSD 14 of the setup in-store device 1 (representative terminal). Thereafter, the worker installs the representative terminal and set terminals (other in-store devices 1) in the store, and then the in-store devices 1 execute initial setting processing, thereby initial setup is performed in an automated manner for the plurality of in-store devices 1 that are the set terminals.

Thus, as compared with a case in which initial settings are performed separately for each of the plurality of the in-store devices 1, it is possible to greatly reduce trouble for the worker.

When the in-store device 1 receives the initial setting information DAB transmitted from another in-store device 1, the in-store device 1 transfers the initial setting information DAB. As a result, the initial setting information DAB can be received by the plurality of in-store devices 1 disposed in a range exceeding a communicable range without increasing the communicable range of the wireless controller 16 in the 920 mHz band communication.

The in-store device 1 restricts retransfer of the transferred initial setting information DAB according to a predetermined condition. As a result, it is possible to prevent the initial setting information DAB from being continuously transferred for a long time.

The in-store device 1 accesses the management server 3 after the initial setting is completed, confirms validity of setting information used in the initial setting. When it is confirmed that the setting information is not valid, the in-store device 1 acquires valid setting information from the management server 3, and performs the initial setting again based on the valid setting information. As a result, it is possible to reliably perform an appropriate initial setting.

The in-store device 1 accesses the management server 3 after the initial setting is completed, confirms validity of setting information used in the initial setting. When it is confirmed that the setting information is valid, the in-store device 1 can acquire an additional file from the management server 3.

The present embodiment can be modified in various manners as follows.

The purposes of using communication after the initial setting may be selected freely, and the communication can be performed for any communication system having a configuration different from the configuration of the unmanned store system 100.

Some or all functions implemented by the CPU 11 executing an information processing can also be implemented by hardware such as a dedicated or programmed logic circuit that executes an information processing not based on a program. The above-described functions may also be implemented by combining software control with the hardware such as the logic circuit described above.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A communication system for unmanned stores, the system comprising:
   a management server connected to a communication network;
   a system processing device connected to the communication network;
   a wireless communication access point connected to the communication network; and
   a plurality of communication devices configured to provide information to the system processing device by wireless communication through the wireless communication access point and the communication network, each communication device including:
      a first wireless controller for communicating with the wireless communication access point according to certain setup parameters;
      a second wireless controller for directly communicating with other communication devices in the plurality of communication devices;
      a local storage unit for storing information in a non-volatile manner; and
      a processor configured to, in an initial setup operating mode:
         turn on the second wireless controller,
         determine whether the communication device is a representative terminal or a set terminal based on information stored in the local storage unit,
         if the communication device is the representative terminal, broadcast initial setting information via the second wireless controller, the initial setting information being stored in the local storage unit before entering the initial setup operating mode and including the certain setup parameters for first wireless controllers of the other communication devices in the plurality of communication devices, and if the communication device is the set terminal, wait for reception of initial setting information via the second wireless controller.

2. The communication system according to claim 1, wherein the processor is further configured to, in the initial setup operating mode:

broadcast initial setting information via the second wireless controller if the communication device is the set terminal that has previously received initial setting information via the second wireless controller and successfully setup communication via the first wireless controller according to the certain setup parameters.

3. The communication system according to claim 2, wherein the processor is further configured to, before broadcasting the initial setting information:

extract the certain setup parameters for the first controller from the initial setting information received via the second wireless controller if the communication device is the set terminal, setup communication via the first wireless controller according to the extracted certain setup parameters, and transmit an inquiry from the first wireless controller to the management server via the wireless communication access point to confirm whether the initial setting information is valid.

4. The communication system according to claim 3, wherein the processor is further configured to determine whether the management server to which the inquiry is transmitted is a valid management server.

5. The communication system according to claim 4, wherein the validity of the management server is determined based on a pre-established digital certificate included in the inquiry after extraction from the initial setting information.

6. The communication system according to claim 4, wherein the processor is further configured to:

receive a response to the inquiry via the first wireless controller, the response including additional file information, and store the additional file information in the local storage unit if the initial setting information and management server are both confirmed as valid in the response to the inquiry.

7. The communication system according to claim 3, wherein the processor is further configured to:

receive a response to the inquiry via the first wireless controller, the response including additional file information, and store the additional file information in the local storage unit if the initial setting information is confirmed as valid in the response to the inquiry.

8. The communication system according to claim 7, wherein the additional file includes system setting parameters specific to the communication device transmitting the inquiry.

9. An unmanned store system, comprising:

a management server connected to a communication network;

an unmanned system processing device connected to the communication network;

a wireless communication access point connected to the communication network; and a plurality of in-store devices positioned in a sales area of a store and configured to provide information to the unmanned system processing device by wireless communication through the wireless communication access point and the communication network, each in-store device including:

a first wireless controller for communicating with the wireless communication access point according to certain setup parameters;

a second wireless controller for directly communicating with other in-store devices in the plurality of in-store devices;

a local storage unit for storing information in a non-volatile manner; and a processor configured to, in an initial setup operating mode:

turn on the second wireless controller, determine whether the in-store device is a representative terminal or a set terminal based on information stored in the local storage unit, if the in-store device is the representative terminal, broadcast initial setting information via the second wireless controller, the initial setting information being stored in the local storage unit before entering the initial setup operating mode and including the certain setup parameters for first wireless controllers of the other in-store devices in the plurality of in-store devices, and if the in-store device is the set terminal, wait for reception of initial setting information via the second wireless controller.

10. The unmanned store system according to claim 9, wherein the processor is further configured to, in the initial setup operating mode:

broadcast initial setting information via the second wireless controller if the in-store device is the set terminal that has previously received initial setting information via the second wireless controller and successfully setup communication via the first wireless controller according to the certain setup parameters.

11. The unmanned store system according to claim 10, wherein the processor is further configured to, before broadcasting the initial setting information:

extract the certain setup parameters for the first controller from the initial setting information received via the second wireless controller if the in-store device is the set terminal, setup communication via the first wireless controller according to the extracted certain setup parameters, and transmit an inquiry from the first wireless controller to the management server via the wireless communication access point to confirm whether the initial setting information is valid.

12. The unmanned store system according to claim 11, wherein the processor is further configured to determine whether the management server to which the inquiry is transmitted is a valid management server.

13. The unmanned store system according to claim 12, wherein the validity of the management server is determined based on a pre-established digital certificate included in the inquiry after extraction from the initial setting information.

14. The unmanned store system according to claim 12, wherein the processor is further configured to:

receive a response to the inquiry via the first wireless controller, the response including additional file information, and store the additional file information in the local storage unit if the initial setting information and management server are both confirmed as valid in the response to the inquiry.

15. The unmanned store system according to claim 11, wherein the processor is further configured to:
  receive a response to the inquiry via the first wireless controller, the response including additional file information, and
  store the additional file information in the local storage unit if the initial setting information is confirmed as valid in the response to the inquiry.

16. The unmanned store system according to claim 15, wherein the additional file includes system setting parameters specific to the in-store device transmitting the inquiry.

17. An in-store device for an unmanned store system, the in-store device comprising:
  a first wireless controller for communicating with a wireless communication access point according to certain setup parameters;
  a second wireless controller for directly communicating with other in-store devices;
  a local storage unit for storing information in a nonvolatile manner; and
  a processor configured to, in an initial setup operating mode:
    turn on the second wireless controller,
    determine whether the in-store device is a representative terminal or a set terminal based on information stored in the local storage unit,
    if the in-store device is the representative terminal, broadcast initial setting information via the second wireless controller, the initial setting information being stored in the local storage unit before entering the initial setup operating mode and including the certain setup parameters for first wireless controllers of the other in-store devices, and
    if the in-store device is the set terminal, wait for reception of initial setting information via the second wireless controller.

18. The in-store device according to claim 17, wherein the processor is further configured to, in the initial setup operating mode:
  broadcast initial setting information via the second wireless controller if the in-store device is the set terminal that has previously received initial setting information via the second wireless controller and successfully setup communication via the first wireless controller according to the certain setup parameters.

19. The in-store device according to claim 18, wherein the processor is further configured to, before broadcasting the initial setting information:
  extract the certain setup parameters for the first controller from the initial setting information received via the second wireless controller if the in-store device is the set terminal,
  setup communication via the first wireless controller according to the extracted certain setup parameters, and
  transmit an inquiry from the first wireless controller to a management server via the wireless communication access point to confirm whether the initial setting information is valid.

20. The in-store device according to claim 19, wherein the processor is further configured to determine whether the management server to which the inquiry is transmitted is a valid management server.

\* \* \* \* \*